United States Patent

[11] 3,599,550

| [72] | Inventor | Keezi Kaneko Minamiashigara-Machi, Japan |
|---|---|---|
| [21] | Appl. No. | 736,407 |
| [22] | Filed | June 12, 1968 |
| [23] | | Division of Ser. No. 427,733, Jan. 25, 1965, Pat. No. 3,434,782. |
| [45] | Patented | Aug. 17, 1971 |
| [73] | Assignee | Fuji Shashin Film Kabushiki Kaisha Minamiashigaramachi, Ashigarakami-gun, Japan |

[54] FILM MAGAZINE FOR MOVIE CAMERAS
4 Claims, 3 Drawing Figs.

[52] U.S. Cl. ..................................... 95/31 FS,
352/72, 95/10 C
[51] Int. Cl. ..................................... G03b
17/26, G03b 19/04
[50] Field of Search ........................... 95/10, 31;
352/72, 78, 141

[56] References Cited
UNITED STATES PATENTS

| 3,212,838 | 10/1965 | Martin.................... | 352/78 |
| 3,276,340 | 10/1966 | Nerwin.................... | 95/31 |
| 3,309,975 | 3/1967 | Kremp.................... | 95/31 (X) |
| 3,364,831 | 1/1968 | Kremp.................... | 95/31 |
| 3,422,740 | 1/1969 | Nerwin.................... | 352/78 (X) |
| 3,312,158 | 4/1967 | MacMillin et al............ | 352/78 X |

Primary Examiner—Samuel S. Matthews
Assistant Examiner—Russell E. Adams, Jr.
Attorneys—Ralph E. Bucknam, Jesse D. Reingold, Henry A. Marzullo, Jr. and Robert R. Strack ABSTRACT: Film magazine for use in movie cameras wherein the sensitivity of the film within the magazine is mechanically represented by arcuate grooves upon the side thereof; the length of said grooves being proportional to the sensitivity of the film.

PATENTED AUG 17 1971　　　　　　　　　　　3,599,550

INVENTOR.
KEEZI KANEKO
BY Henry A. ....... Jr.
Buckman and Archer
HIS ATTORNEYS

FILM MAGAZINE FOR MOVIE CAMERAS

BACKGROUND OF THE INVENTION

This application is a divisional of copending U.S. Pat. application Ser. No. 427,733 filed Jan. 25, 1965, now U.S. Pat. No. 3,424,782.

SUMMARY OF THE INVENTION

The present invention relates to film magazines for movie cameras which have means for automatically adjusting the exposure-control system in accordance with film sensitivity.

The present invention has as an object the provision of an improved film magazine for movie cameras which has a means for automatically adjusting the automatic-exposure-control system of the camera in accordance with the film sensitivity.

Another object of the invention is to provide an improved film sensitivity indication for film magazines which does not require any projecting surfaces on the magazine.

Yet another object of the invention is to provide improved film-sensitivity-indicating means on a film magazine which can be detected by a camera member rotatably about an axis parallel to the plane of the film.

In accordance with the invention there is provided on either or both surfaces of a film magazine one or more grooves, the length of which corresponds to film sensitivity; and which grooves cooperate with a movable pin in the automatic exposure system of the movie camera.

As illustrated by particular embodiments of the invention, the groove or grooves may be of an arcuate shape and may be concentric with the film spool in the magazine. In cases where the present invention is employed in a magazine containing a double track film, it is preferable to provide the grooves on both magazine surfaces.

In order that the present invention may be more clearly understood and readily carried into effect, reference should be had to the accompanying drawings in which several forms of the present invention are illustrated by way of example.

DESCRIPTION OF PREFERRED EMBODIMENTS

Figure 1:
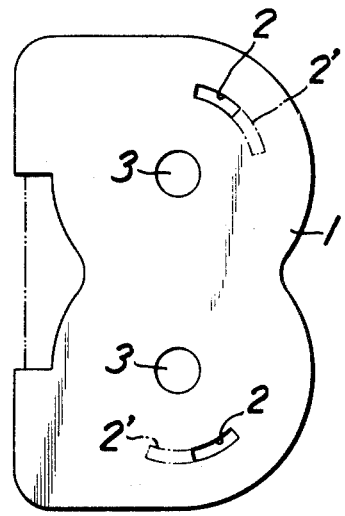
FIG. 1 is a plan view of a film magazine embodying the present invention.

Referring now to the drawings, particularly to FIG. 1, the magazine 1 has two arcuate grooves 2, each of which is concentric with either one of film spools 3. The length of each groove 2 is determined in accordance with the sensitivity of the charged film. In FIG. 1, longer grooves are illustrated by a numeral 2' as an example.

Figure 3:
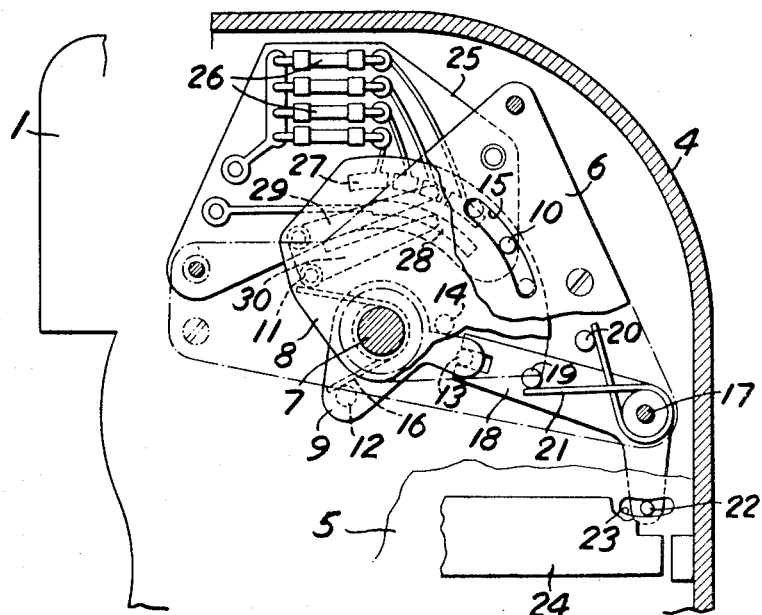
FIG. 3 shows an example of automatic-exposure-control mechanism of a movie camera adapted to cooperate with the magazine shown in FIG. 1.

The groove 2 cooperates with the automatic-exposure-control mechanism provided in the camera and serves to adjust said mechanism automatically in accordance with film sensitivity. FIG. 3 shows a portion of one such control mechanism for cooperation with the magazine 1 of FIG. 1.

In FIG. 3, the inner wall plate 5 is partially removed to illustrate the interior arrangement of parts, and as shown in the drawing, a shaft 7 which is mounted on the baseplate secured on the inner wallplate 5 has a setting plate 8 and a lever 9 rotatably mounted thereon. The setting plate 8 has an upright pin 10 projecting into the magazine chamber through an arcuate slot 15 provided in the plates 5 and 6. A spring 15 is interposed between a pin 11 on the plate 8 and a pin 12 on the lever 9 and urges said plate 8 and said lever 9 to rotate in reverse direction which each other until the edge of the lever 9 abuts against the pin 14 provided on the plate 8. Further, the lever 9 has a pin 13 which engages with the forked end of the arm 18 pivotable about the fulcrum. The arm 18 has at the end remote from the forked end a pin 22 projecting through a slot 23 in the plate 5 into the magazine chamber so as to be able to engage with the hook 24 in response to locking of the cover of the camera. The arm 18 is biased by means of a spring 21 interposed between the fixed pin 20 and the pin 19 on the arm 18 so as to rotate clockwise.

The electric panel 25 disposed at the underside of the setting plate 5 has a number of resistors 26, the same number of contacts 27 for each resistor, and a contact 28 opposed to said contacts 27. The sliding contactors 29 and 30 which are secured on the lower surface of the plate 8 move along the contacts 27 and 28 respectively upon rotation of the plate 8.

When the film magazine shown in FIG. 1 is charged in the camera, the film spool 3 aligns concentrically with the shaft 7, and the groove 2 is disposed over the slot 15. Thus, the pin 10 is slidably received in the groove 2. With these, arrangements, the cover is closed and locked pressing the pin 22 toward right by the end of the hook 24. The arm is rotated counterclockwise against the action of the spring 21, thus rotating the lever 9 clockwise. This causes clockwise rotation of the setting plate 8, and the pin moves along the groove 2 until it reaches to the end thereof, where the plate 8 is prevented further rotation and continued rotation of the lever 9 causes deflection of the spring 16.

As apparent from above description, the angular position of the setting plate is determined by the groove length, and thus the electric resistance of the photoelectric circuit is adjusted in accordance with the film sensitivity.

Although the groove 2 is disposed concentrically with the film spool 3 in this embodiment, this may of course be positioned eccentrically with said film spool.

Figure 2:
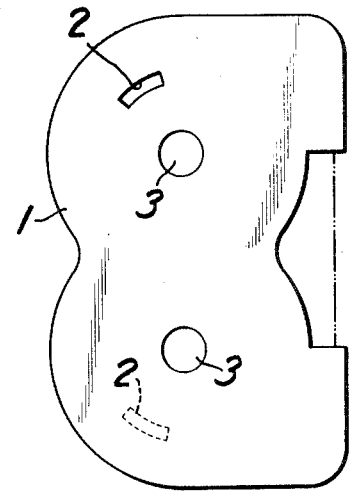
FIG. 2 is also a plan view of further embodiment of the present invention.

FIG. 2 shows a third embodiment of the present invention employed in a film magazine containing a double track film, in which the film magazine 1 has two arcuate grooves 2 disposed one on each surface.

It is to be understood that the invention is not limited to the specific embodiments herein illustrated and described, but may be used in other ways without departing from the spirit and scope thereof, and other changes can be made which would come within the scope of the invention as limited only by the appended claims.

What I claim is:

1. A film magazine for use in a camera having automatic-exposure-control means, comprising substantially flat sides, adjacent film chambers wherein the film is would about individual parallel axes which are perpendicular to the sides of said magazine, and an arcuate groove in at least one of said sides having a length proportional to the speed of the film in said magazine, said groove being generated at a fixed radius about one of said parallel axes.

2. A film magazine according to claim 1, wherein one of said grooves appears on each side of said magazine.

3. A film magazine according to claim 2, wherein each of said arcuate grooves is generated about a different one of said parallel axes.

4. A film magazine according to claim 1, wherein said groove is generated at a radius less than the outside radius of said film winding when said film is stored about one axis only.